Figure 1:
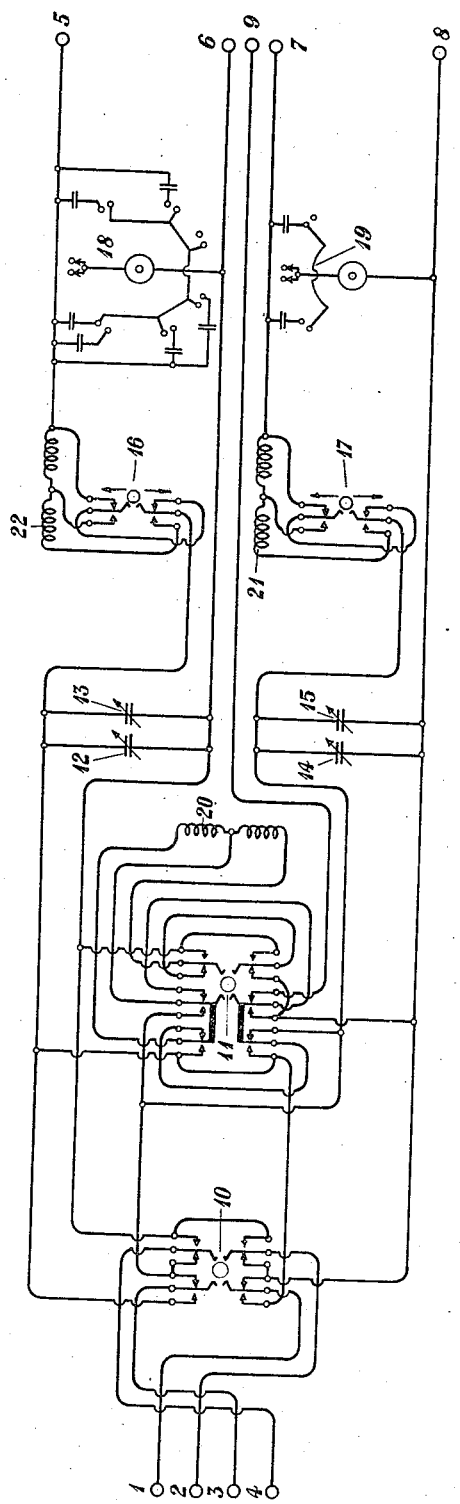

F. H. BEST.
ELECTRICAL TESTING SYSTEM.
APPLICATION FILED DEC. 30, 1921.

1,432,829.

Patented Oct. 24, 1922.
2 SHEETS—SHEET 1.

INVENTOR
F. H. Best
BY
ATTORNEY

F. H. BEST.
ELECTRICAL TESTING SYSTEM.
APPLICATION FILED DEC. 30, 1921.

1,432,829.

Patented Oct. 24, 1922.
2 SHEETS—SHEET 2.

INVENTOR
F. H. Best
BY
ATTORNEY

Patented Oct. 24, 1922.

1,432,829

UNITED STATES PATENT OFFICE.

FRED H. BEST, OF WESTFIELD, NEW JERSEY, ASSIGNOR TO AMERICAN TELEPHONE AND TELEGRAPH COMPANY, A CORPORATION OF NEW YORK.

ELECTRICAL TESTING SYSTEM.

Application filed December 30, 1921. Serial No. 525,856.

*To all whom it may concern:*

Be it known that I, FRED H. BEST, residing at Westfield, in the county of Union and State of New Jersey, have invented certain Improvements in Electrical Testing Systems, of which the following is a specification.

This invention relates to electrical testing systems and particularly to means for measuring the impedance unbalance between loaded signaling circuits.

In making impedance unbalance tests, a current, preferably sinusoidal and of definite frequency, is transmitted from the testing point over one of the line circuits and is received over another of the line circuits connected with the first line circuit at some distant point. If these line circuits are simply connected together at the distant point but are not individually terminated there, a false unbalance measurement is obtained. Therefore, it has been customary to terminate each of the circuits under test by an artificial line which represents electrically an infinite length of line having the same characteristics as the real line circuits. In the case of loaded signaling circuits, such artificial lines are designed to simulate the continuation of the loading.

In designing and constructing such artificial lines for use in connection with loaded signaling circuits, the electrical characteristics of the artificial line are such as would be possessed by a real line of infinite length; in which the first loading coil was preceded by a definite length for example, .2 of a mile of open wire line. It should be understood that this specific figure is used merely for the purpose of illustration and constitutes no limitation upon the invention.

In order to adapt such standard artificial lines to the conditions existing upon real lines where the length of circuit between the last loading point and the terminal of the circuit may vary from zero to almost a complete loading section, it is necessary to insert in the connecting circuit between the real line circuit and the artificial line a net-work having variable electrical properties, by means of which the circuit between the last loading point and the artificial line may be made equal electrically to a full loading section.

It is the object of this invention to provide a simple and compact network having a switching means associated which may be used in connection with the standard artificial lines for building out the last loading section of real lines, and to facilitate the connection of the artificial lines with the real lines in testing.

Figure 2:
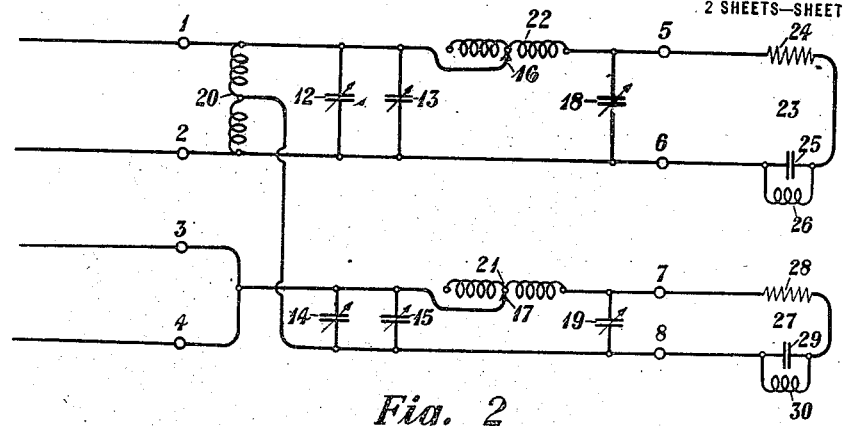
Figure 3:
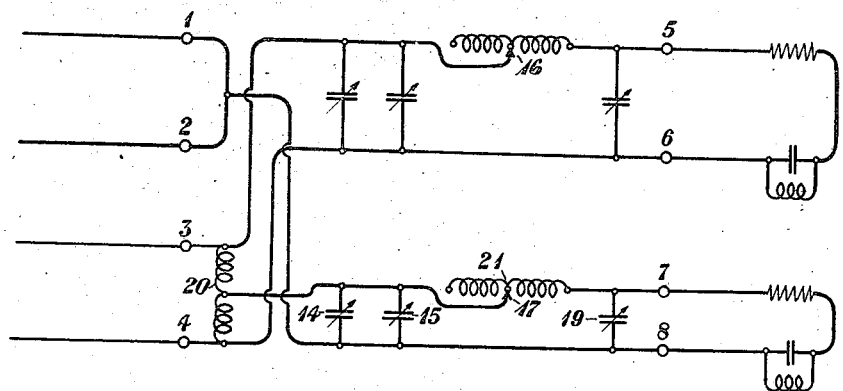
Figure 4:
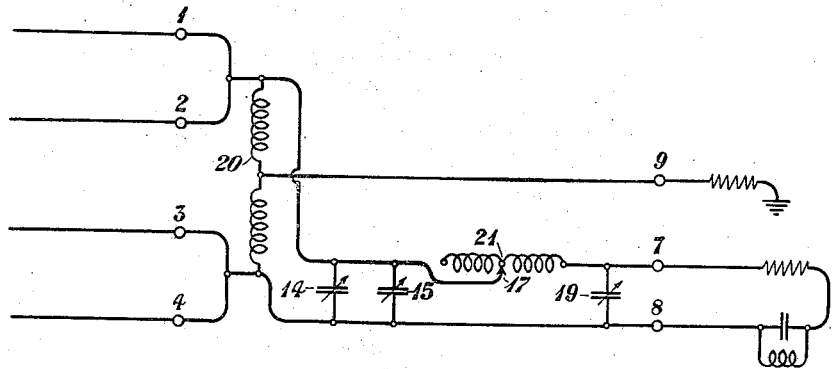

Other and further objects of this invention will be apparent from the following description when read in connection with the attached drawing, of which Figure 1 is a circuit diagram of a preferred form of this invention, and Figs. 2, 3 and 4 represent schematically the circuit conditions for various settings of the switches and other apparatus connected with the circuit shown in Fig. 1.

In Fig. 1, the loaded line conductors are connected with the circuit of the figure by the binding posts 1, 2, 3, and 4 shown at the left-hand side of the drawing. The artificial line which represents a loaded physical circuit of infinite length such as the pair of conductors 1—2, or 3—4, is connected with the binding post 5—6 shown at the right-hand side of the drawing. Similarly, an artificial line representing a loaded phantom circuit of infinite length such as that superposed upon the physical circuits 1—2 and 3—4 may be connected with the binding post 7—8 at the right-hand side of the figure. Keys 10 and 11 are intended to connect the apparatus shown in the figure and also the artificial lines with the circuits connected with the binding posts 1, 2, 3, and 4, the connection depending upon the position of the said keys. Thus, when both keys are in their normal unoperated position, the retardation coil 20 is bridged across the phantom circuit and the variable condensers 14, 15 and 19, and the variable inductance 21 is effectively bridged across the outer terminals of the coil 20 and in parallel with the artificial line connected to the terminals 7 and 8. If the keys 10 and 11 are operated downward, the circuit is arranged for building out the circuit connected with the terminals 1 and 2, and similarly, if the said keys are operated upward, the circuit of the figure is connected so as to build out the section between the circuit connected with the terminals 3 and 4 and the proper artificial line. The building out circuit for the physical line circuits includes the variable condensers, 12 13 and 18 and the variable inductance 22. The amount of the inductances 21 and 22 included in the building out circuit is controlled by the operation of the switches 17 and 16 respectively.

Figs. 2, 3 and 4 will be clear from the following description of the manner in which the circuit embodying my invention is employed.

Let it be assumed that two loaded physical circuits have been connected to the terminals 1—2 and 3—4 and that the said physical circuits have superimposed thereon a loaded phantom circuit, and it is proposed to measure the impedance unbalance existing between the various circuits of this group. Let it also be assumed that there has been connected with the terminals 5—6 an artificial line representing a loaded circuit of infinite length having the same characteristics as either of the physical circuits connected with the left-hand terminals, and also that an artificial line representing a loaded phantom circuit of infinite length and having the same characteristics as the phantom circuit superimposed upon the said physical circuits has been connected with the terminals 7—8. Let it further be assumed that the said artificial lines are designed to represent real lines in which .2 of a mile of open wire lines precede the first loading point and that the distance between the last loading point on the physical and phantom circuits connected with the terminals 1—2 and 3—4 is less than .8 of a mile, so that it is necessary to build out this connecting circuit electrically to the assumed predetermined limit of .8 of a mile. The method of building out each of the physical circuits is shown clearly in Figs. 2 and 3, and that for the phantom circuit is shown in Fig. 4. In order to build out first the physical circuit connected with the terminals 1—2, the keys 10 and 11 are operated downwardly, thereby bridging across the said circuit the retardation coil 20, as shown in Fig. 2. This bridges across the said coil the variable condensers 12, 13 and 18, and also connects into one side of the built-out section the variable inductance 22, whose magnitude is controlled by the operation of the key 16. The artificial line 23 is connected across the terminals 5—6. This artificial line includes a resistance 24, a condenser 25 and an inductance 26. The magnitude of the elements comprising the artificial line depends upon the magnitude of the corresponding elements of the real line. The conductors of the physical circuit connected with the terminals 3—4 are short-circuited by the upper contacts of switch 10 and connected with one side of the condensers 14, 15 and 19, and in series with the variable inductance 21. The artificial line 27, designed to balance the phantom circuit, comprises a resistance 28, a condenser 29 and an inductance 30, the magnitude of which elements is dependent upon the magnitudes of the corresponding elements of the real phantom circuit. Since the distance between the last loading point on the circuits connected with the terminals 1—2 and 3—4 and the said terminals is known, and also the assumed equivalent of the circuit preceding the first loading point of the artificial line is known, it is simply necessary to adjust the various elements connected with the building out circuit in order that the completed connection will represent one loading section. Thus, condensers 12 and 13 are adjusted to increase the capacity to the predetermined amount and the magnitude of the variable inductance 22 is controlled by the key 16. Similarly, the phantom circuit is built out to the predetermined difference by adding capacity by means of the variable condensers 14 and 15, and also the variable inductance 21 is adjusted by means of the key 17.

If the physical and phantom circuits terminate in other ways, as, for example, a half loading coil or a full loading coil, the last section may be built out for use in connection with the standard artificial lines by proper adjustment of the various variable condensers and inductances connected with the building out network shown in Fig. 1.

In order to build out the physical circuit connected with the terminals 3—4 in order to measure the impedance unbalance of that circuit to the other circuits, the keys 10 and 11 are operated upwardly, which establishes the circuit arrangement as shown in Fig. 3. In order to build out the phantom circuit to measure its impedance unbalance to ground, the switches 10 and 11 are left in their normal unoperated position, which establishes the circuit arrangement shown in Fig. 4.

It will be seen from the foregoing that by means of the circuit arrangement shown in Fig. 1, any physical circuit of a group of circuits whose impedance unbalance to the other circuits of the said group it is desired to know, or any phantom circuits whose impedance unbalance to ground, or to circuits of another phantom group it is desired to know, may be built out for use with standard terminating networks, and the building out network may be rapidly adjusted for use with the various circuits of the group.

The following schedule shows the flexibility of this piece of apparatus for adjustment of various terminal lengths of line circuits which are intended to be connected with the standard artificial line which, as stated, represents a real line in which the first loading point is preceded by .2 of a mile of line circuit.

By "terminal lengths of line circuits" I mean that section of line circuit between the last loading point on the circuit and the actual end of the said circuit. Five general situations, designated a, b, c, d, and e, have been considered and the setting of the various keys for these general situations is as follows.

(a) *Circuit terminating in .8 section of open wire.*

All condenser dials and keys 16 and 17 set at normal.

(b) *Circuit terminating in more than .8 section but not exceeding a full section of open wire.*

Build out physical circuit capacity to that of a full loading section by means of dials 12 and 13.

Build out phantom circuit capacity to that of a full section by means of dials 14 and 15.

Set keys 16 and 17 downwards.

Set dials 18 and 19 for .8 section of proper type.

(c) *Circuit terminating in one-half loading coil.*

Set dials 12, 13, 14 and 15 on "zero."
Set keys 16 and 17 upwards.
Set dials 18 and 19 for an .8 section of proper type.

(d) *Circuit terminating in full coil.*

Set dials 12, 13, 14 and 15 and keys 16 and 17 at normal.
Set dials 18 and 19 for .8 section of proper type.

(e) *Circuit terminating in less than .8 section of open wire.*

Build out physical circuit capacity to that of an .8 section by means of dials 12 and 13.
Build out phantom circuit capacity to that of .8 section by means of dials 14 and 15.
Set keys 16 and 17 at normal.
Set dials 18 anl 19 at "open."

Although this invention has been disclosed as embodied in a certain form, it is to be understood that it is capable of embodiment in other and different forms without departing from the spirit and scope of the appended claims.

What is claimed is:

1. In an electrical testing system, the combination of a line circuit containing a plurality of spaced inductance coils, an artificial line simulating the characteristics of the said line circuit and representing electrically a line of infinite length, and a network having adjustable electrical properties adapted for insertion between the said line circuit and the said artificial line to vary the impedance of the circuit between the last spaced inductance coil and the said artificial line.

2. In an electrical testing system, the combination of a line circuit containing a plurality of spaced inductance coils, an artificial line comprising resistance, inductance and capacity, the magnitudes of which are dependent upon the magnitudes of similar elements of the said line circuit which functions as an infinite section of the said line circuit, and a connecting network having adjustable electrical elements adapted for insertion between the said line circuit and the said artificial line to vary the impedance of the circuit between the last spaced inductance coil and the said artificial line.

3. In an electrical testing system, the combination with a loaded line circuit of an artificial line representing electrically an infinitely long section of the loaded line circuit, and a connecting network adapted to be inserted between the said line circuit and the said artificial line in order to build out electrically to a predetermined extent the circuit between the last loading point of the said line circuit and the said artificial line.

4. In an electrical testing system for determining the impedance unbalance between electrical circuits, the combination of a line circuit having spaced inductance, an artificial line representing electrically an infinite length of the said line circuit, and a connecting network adapted to increase the impedance of the circuit between the last spaced inductance and the said artificial line.

5. In an electrical testing system designed to measure the impedance unbalance between a group of physical and phantom circuits, the combination of two similar inductively loaded physical circuits having a loaded phantom circuit superimposed thereon, an artificial line representing electrically an infinite length of either of said physical circuits, a second artificial line simulating the said phantom circuit, a building-out network comprising a retardation coil adapted to be bridged across said physical circuit, means to vary the capacity of the circuit across which the said coil is bridged, and means to short-circuit the said other physical circuit and to vary the capacity of said short-circuited pair to the said first mentioned pair.

In testimony whereof, I have signed my name to this specification this 29th day of December, 1920.

FRED H. BEST.